United States Patent [19]

Lean

[11] 4,084,191

[45] Apr. 11, 1978

[54] ACOUSTO-OPTICAL SCANNER

[75] Inventor: Eric Gung-Hwa Lean, Mahopac, N.Y.

[73] Assignee: International Business Machines Corporation, Armonk, N.Y.

[21] Appl. No.: 752,758

[22] Filed: Dec. 20, 1976

[51] Int. Cl.² .................. H04N 3/12; H03H 9/00
[52] U.S. Cl. .................................... 358/213; 333/72; 350/96.13
[58] Field of Search ............... 358/213, 235, 285, 41; 310/8.1, 8.2, 9.8; 333/72; 250/96 WG, 161 R

[56] References Cited

U.S. PATENT DOCUMENTS

| 3,826,866 | 7/1974 | Quate et al. | 358/213 |
| 3,970,778 | 7/1976 | Adkins | 358/213 |
| 4,012,586 | 3/1977 | Roos | 358/285 |
| 4,025,954 | 5/1977 | Bert | 358/213 |

Primary Examiner—Robert L. Griffin
Assistant Examiner—Aristotelis M. Psitos
Attorney, Agent, or Firm—Robert E. Sandt; Ronald L. Drumheller

[57] ABSTRACT

A scanning apparatus for converting an optical line image to a serial electrical analog signal by launching an acoustic wave in a plurality of ridged waveguides each of a different length. In one embodiment the launching transducer includes an electro-optical layer which modulates the acoustic wave as a function of the incident light intensity. In a second embodiment the acoustic wave is launched in each waveguide with the same amplitude but interacts with an acousto-optical overlay on the waveguide to amplitude modulate the intensity of the propagating acoustic wave. The thus generated and modulated acoustic waves are converted to electrical signals either by reflection back to the launching transducer or by individual transducers on each channel. The differing lengths converts the parallel image to a series electrical signal.

8 Claims, 2 Drawing Figures

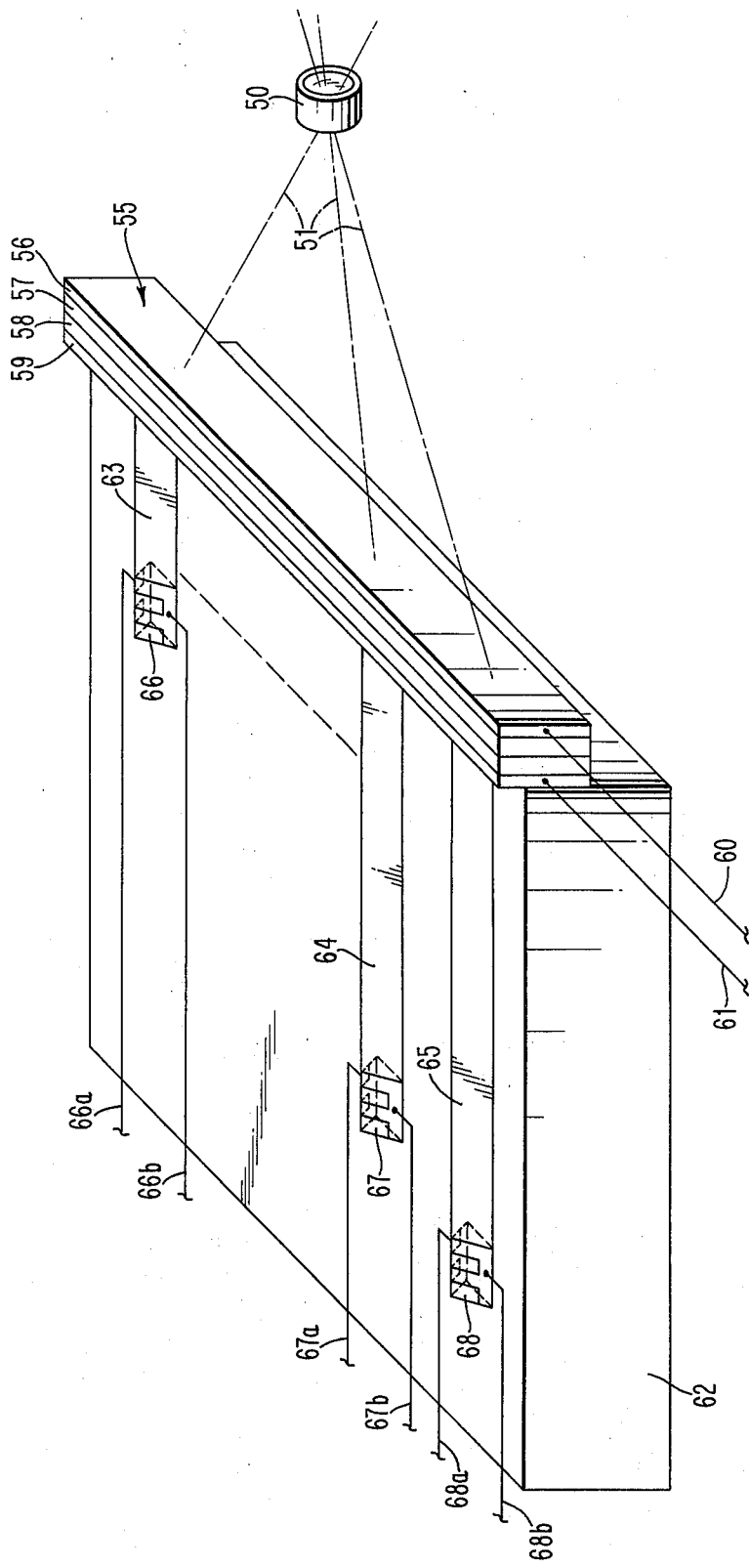

ACOUSTO-OPTICAL SCANNER

FIELD OF INVENTION

This invention relates to scanners for scanning an optical image, and more particularly to such an apparatus which exploits the interaction of acoustic waves and a photoconductive lamina in a ridged waveguide.

Yando in U.S. Pat. No. 3,202,824 launches a sonic wave in a piezoelectric strip across which an electric field is produced by an overlying photoconductive layer upon which the optical image is incident. The interaction of the sonic wave and the photoconductor produces a serial electrical output which manifests the intensity distribution of the incident optical image.

Quate et al in U.S. Pat. No. 3,826,865 employ oppositely propagating sonic waves to interrogate the transverse field distribution produced by a photoconductor having a distributed line image incident thereon.

Eric Ash et al in a paper entitled "Microsecond Surface Wave-Guides," IEEE Transactions, Vol.MTT-17, No.11, November 1969, p.882, describe the propagation of sound waves in ridged waveguides.

SUMMARY OF THE INVENTION

The instant invention exploits the interaction of sonic waves and photoconductors in a ridged waveguide structure to provide an electrical output manifesting the intensity distribution of an incident linear optical image.

It is thus an object of this invention to produce a scanner having a plurality of ridged waveguides of discretely different lengths such that a sonic wave travelling in each of the waveguides and modulated in accordance with an incremental segment of a dissected optical image produces an electrical signal manifestive of the distribution of the light intensity.

A further object is to produce a scanner in accordance with the preceding object in which the intensity of the acoustic wave launched into each respective waveguide is modulated in accordance with the intensity of a respective segment of a linear optical image.

A further object is to produce a scanner in accordance with the first object in which the same amplitude of acoustic wave is launched into all waveguides and is intensity modulated by interaction of the piezoelectric material of the waveguides and an overlying photoconductive layer upon which is incident a linear optical image.

The foregoing and other objects of the present invention will be apparent from the more particular description of the preferred embodiments of the invention, as illustrated in the accompanying drawings.

DESCRIPTION OF THE DRAWINGS

FIG. 2 depicts a scanner which modulates the sonic wave before it is launched into each of the waveguides.

Turning now to FIG. 1, a substrate 10, preferably of silicon, is preferentially etched to form a plurality of upstanding ridged waveguides 12 through 20, of which only three are illustrated. Each of these waveguides is of a discretely different length so that a sonic wave injected in parallel into each of the waveguides will reach the other end of the guide with a duration of travel dependent upon the length of the guide. Absent an absorber the wave will be reflected back from the other ends by surfaces 21 to the launching transducer with a total transit time equal to a function of double the length of each of the respective waveguides.

Figure 1:
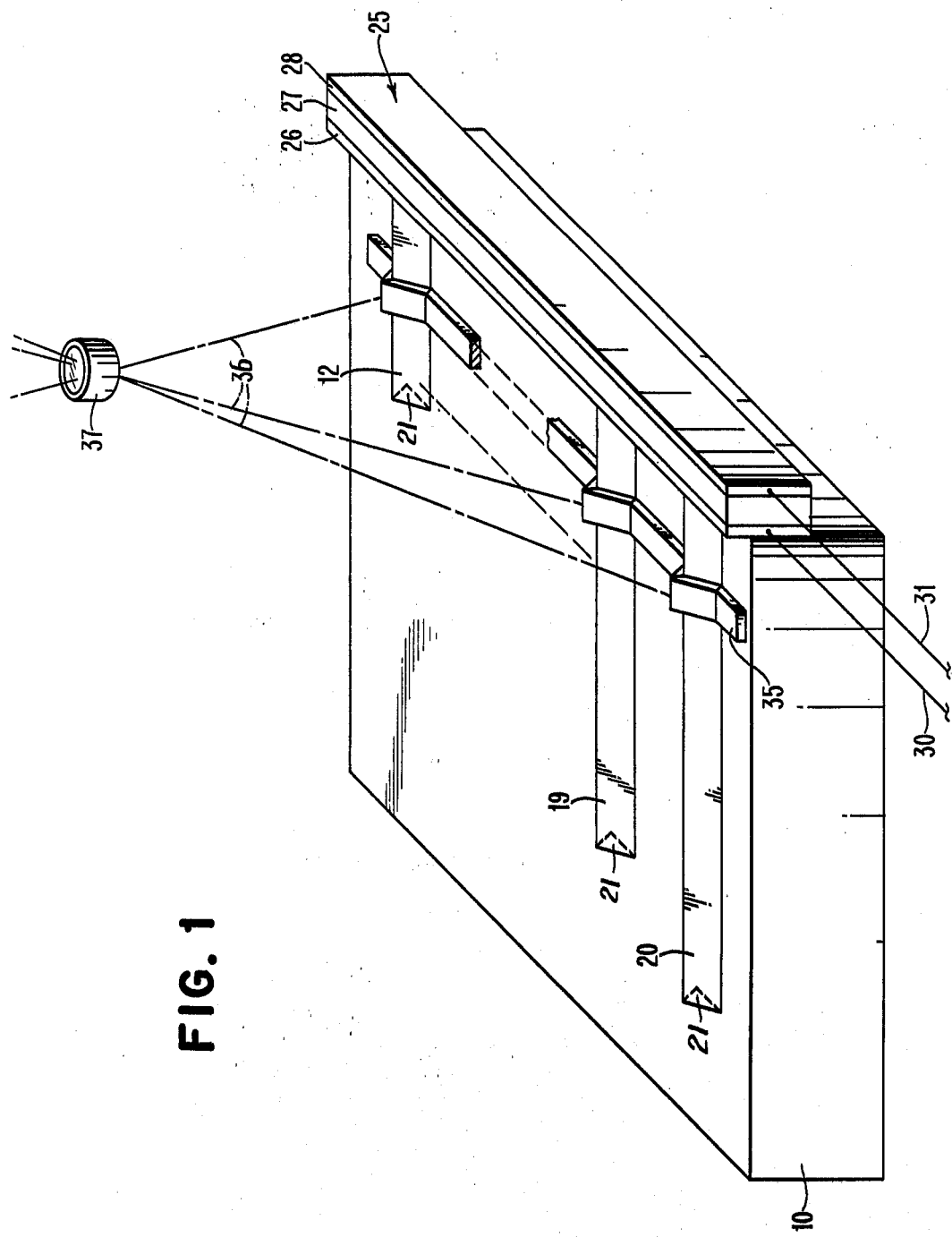
FIG. 1 depicts a scanner which modulates the sonic wave in each of the waveguides.

The waveguides have been shown as triangular in cross-section. Equally well they may be fabricated with a rectangular cross-section. So too by suitable masking and etching parallel grooves may be etched into the substrate leaving the intervening webs as the waveguide members.

It must be realized that the limitations of drawing do not permit showing the relative size of the ridges and their spacing of the respective channels. A typical geometry provides for a 1 mil spacing between channels so that 1000 delay lines may be fabricated in an inch of transverse space. With the reflecting mode, a length difference of 1 mil yields a delay of about 20 nanoseconds for a propagation velocity of $2.5 \times 10^5$ centimeters per second. Such parallel delay lines can also be fabricated by plastic molding.

It will readily be appreciated that with a 1 mil interchannel spacing the image resolution is excellent. Since each is a discrete channel the transverse dimension may be increased to the width of a document to provide a rapid horizontal scan. Vertical scan would be achieved by relative movement of the document.

The acoustic waves are launched into the respective waveguides by the transducer 25. This transducer may be fabricated either by bonding the prefabricated transducer to the waveguides or by successively evaporating the electrode 26, piezoelectric layer 27 and electrode 28 upon the ends of the waveguides.

When an electrical pulse is applied to the wires 30 and 31, the electrodes 26 and 28 create an electrical field across the piezoelectric layer 27 resulting in a dimensional change therein. This change is coupled in parallel into each of the waveguides to propagate therein as an acoustic wave. These ridged waveguides have been shown to support a tightly bound nondispersive family of antisymmetric flexural modes, and other guided modes.

As the acoustic wave propagates with equal velocity in each of the waveguides 12–20, it reaches the piezoelectric stripe 35 which is a thin ribbon-like layer deposited perpendicular to the axis of the waveguides, and derivatively parallel to the transducer 25. This deposited stripe of zinc oxide or aluminum nitride receives a linear optical image, schematically shown as the rays 36, from lens 37.

The interaction of the acoustic waves and the piezoelectric overlay produces piezoelectric pulses in each of the segmental areas of the stripe 35. These piezoelectric pulses in turn are interacted and attenuated by the photo electrons in the silicon waveguides induced as a function of the intensity distribution of the incident optical image. The acoustic wave in each of the waveguides is thus modulated as a function of the intensity of light incident on each of the respective waveguides in the region of the stripe 35.

As the thus modulated waveguide reaches the end of the waveguide it is reflected back at a different time for each waveguide. When each of the thus-reflected waves reaches the transducer 25 it produces an electrical pulse in the transducer which is a function of the light intensity. These pulses are separated in time by the length differences in the waveguide divided by the velocity of propagation times two, because the wave traverses twice the length of each of the waveguides.

As an alternative output, individual piezoelectric transducers may be fabricated individually on each of the waveguides, as shown in FIG. 2 with respect to a second embodiment. This provides for a simplex type of operation. For a further duplex mode of operation, a common transducer like transducer 25 may be attached to the ends of the waveguides to provide a serial output on a common output line with only one traverse by the acoustic waves in the waveguides.

A second embodiment is illustrated in FIG. 2. This structure utilizes the same waveguide geometry and fabrication techniques as in FIG. 1. It differs therefrom in that the acoustic wave which is launched into each of the waveguides is intensity modulated as a function of the spatial distribution of intensity in the linear optical image before coupling into the waveguide.

Specifically, and with reference to FIG. 2, the lens 50 images an optical image, schematically shown by the rays 51, as a line image on the surface of the transducer 55. This transducer consists seriately of the transparent electrode 56, the photoconductive layer 57, the piezoelectric layer 58 and the conductive electrode 59. These may be remotely fabricated and bonded to the waveguides or formed in situ by successive deposition of the layers.

When a potential pulse is applied to the wires 60 and 61 the incident optical image alters the impedance of each incremental segmental volume of the photoconductive layer 57 to produce a correspondingly different potential gradient in each respective segmental volume of the piezoelectric layer 58. This results in a different elastic strain in each corresponding segmental volume of the piezoelectric material and a corresponding modulation of the sonic wave coupled into each of the waveguides 63-65.

As in the previous embodiment there would be many parallel waveguides formed by etching of the substrate 62. A typical spacing is 1 mil. The amplitude modulated sonic wave launched into each of the waveguides 63-65 reaches the end of the waveguide as a function of the length thereof. Thus, each of the transducers 66-68 produces an electrical response on its corresponding output lines 66a, 66b; 67a, 67b; and 68a, 68b, at a different time.

Alternatively, a common transducer in physical coaction with the ends of all of the waveguides may be substituted for the individual transducers to produce a serial multiplex output on a single pair of lines. So too can the ends of the waveguides be made reflective (squared-off ends) to reflect the sonic waves back to input transducer.

The transducer 55 would typically employ lithium niobate or zinc oxide as a piezoelectric layer and CdS or other materials as the photoconductive layer.

It will be seen that both of the foregoing embodiments employ an "organ pipe" geometrical array of ridged waveguides to provide image dissection of a linear optical image with a serial output. The incident light is utilized to modulate the amplitude of a sonic wave propagating in each of the waveguides to produce a serialized output as a function of the distribution of light intensity.

While the invention has been particularly shown and described with reference to the several embodiments, it will be understood by those skilled in the art that various changes in form and detail may be made therein without departing from the spirit of the invention.

What is claimed is:

1. An optical scanning device comprising,
a plurality of discrete acoustic waveguides each of a uniquely different length,
means for producing a linear optical image for scanning,
transducer means operative responsive to said optical image to produce in each of said waveguides a sonic wave having an amplitude proportional to the intensity of a respective corresponding incremental portion of said optical image, and
means cooperative with said waveguides for converting each of said sonic waves into a corresponding electrical impulse, the said means being disposed along said waveguides so as to produce a serial output as a function of the length of each of the respective waveguides.

2. The scanner of claim 1 wherein a common transducer is coactively joined to each of said waveguides to launch a sonic wave of identical amplitude into an end of each of said waveguides, and the other ends of each of said waveguides are formed with wave-reflecting surfaces each of which is spaced a uniquely different distance from said transducer, and said transducer means comprises an overlay of piezoelectric material on each of said waveguides upon which the linear optical image is incident, whereby the acoustic waves produce a piezoelectric pulse in said overlay which interacts with the photo electrons induced in said waveguides by the incident optical image to attenuate the acoustic wave as a function of the intensity of illumination and said common transducer operates to covert the reflected acoustic waves to a serial electrical signal train.

3. The scanner of claim 1 wherein said transducer means comprises a photoconductive sensitive layer and a piezoelectric layer operative responsive to incident light to modulate the spatial distribution of the elastic strain in said piezoelectric layer as a function of the intensity of said incident light when a potential field is applied to said transducer, the said transducer being coactively fixed to each of said waveguides to launch in each an acoustic wave whose amplitude is a function of the elastic strain in the incremental area of the piezoelectric layer abutting the waveguide.

4. An optical scanner comprising:
a plurality of elongated parallel acoustic waveguides each of a different length;
a common transducer coactively coupled to all of said waveguides and operative when electrically energized to launch an acoustic wave of identical amplitude in parallel into said waveguides;
a thin ribbon-like layer of piezoelectric material deposited on said waveguides equidistant from said common transducer;
means for focusing a linear optical image upon said piezoelectric layer; and
means coacting with said waveguides for converting the acoustic wave energy in each of said waveguides into an electrical signal of corresponding intensity,
whereby the acoustic waves propagating in each of said waveguides is amplitude modulated in the region of said piezoelectric layer by the interaction of the piezoelectric pulse induced in said layer and the photo electrons in the waveguides induced by the optical image and the means for converting the thus-modulated acoustic waves produces a serial electrical signal by virtue of the differences in the lengths of the waveguides.

5. The scanner of claim 4 wherein the common transducer operates both as a transmitting and receiving transducer and the ends of the waveguides are provided with perpendicular faces to reflect the acoustic waves back to the common transducer.

6. The scanner of claim 1 wherein each of the waveguides is provided with an individual transducer at the ends remote from said common transducer.

7. The scanner of claim 1 wherein each of the waveguides is coactively coupled to an output transducer at the ends thereof remote from the common transducer.

8. An optical scanner comprising
   a plurality of elongated parallel acoustic waveguides each of a different length,
   a common transducer coactively coupled to all of said waveguides and operative when electrically pulsed to launch an acoustic wave in parallel into said waveguides;
   a photoconductive element integral with said transducer operative responsive to the intensity distribution of an incident light image thereon to modulate the intensity of the acoustic wave launched into each of said waveguides; and
   a transducer coactively coupled to the remote ends of said waveguides to receive the acoustic waves at different times as a function of the lengths of the waveguides and convert the waves into electrical signals having an intensity controlled by the intensity of the respective waves.

* * * * *